United States Patent [19]

Neuman

[11] 3,966,228

[45] June 29, 1976

[54] SEQUENCED ORIFICE FLUID SUPPLY FOR OCCUPANT RESTRAINT SYSTEM

[75] Inventor: Richard F. Neuman, Farmington, Mich.

[73] Assignee: Eaton Corporation, Cleveland, Ohio

[22] Filed: Jan. 31, 1975

[21] Appl. No.: 546,060

Related U.S. Application Data

[63] Continuation of Ser. No. 278,163, Aug. 4, 1972, abandoned.

[52] U.S. Cl. ............................... 280/737; 137/71; 222/3
[51] Int. Cl.² ........................................ B60R 21/08
[58] Field of Search ............... 280/150 AB; 222/3; 137/67, 68, 1, 71

[56] References Cited
UNITED STATES PATENTS

| 3,532,360 | 10/1970 | Leising et al. | 280/150 AB |
| 3,602,527 | 8/1971 | Goetz et al. | 280/150 AB |
| 3,649,045 | 3/1972 | Smith et al. | 280/150 AB |
| 3,674,059 | 7/1972 | Stephenson | 280/150 AB X |
| 3,711,115 | 1/1973 | Lohr | 280/150 AB |
| 3,713,667 | 1/1973 | Blanchard | 280/150 AB |
| 3,722,528 | 3/1973 | Fiala | 280/150 AB X |
| 3,741,584 | 6/1973 | Arai | 280/150 AB |
| 3,854,491 | 12/1974 | Bryan et al. | 280/150 AB X |

Primary Examiner—M. H. Wood, Jr.
Assistant Examiner—John P. Silverstrim
Attorney, Agent, or Firm—Teagno & Toddy

[57] ABSTRACT

An occupant restraint system for a vehicle including an air bag having a collapsed inoperative condition and an expanded operative condition for restraining movement of an occupant of the vehicle during a collision, a fluid supply, and a diffuser for directing fluid from the fluid supply into the air bag. The fluid supply includes a staged source of fluid for expanding the air bag. Fluid from the first source stage is introduced into the diffuser immediately upon the collision of the vehicle to initiate expansion of the air bag. After a time delay of milliseconds, a greater mass flow of fluid from the second source stage is introduced into the diffuser to complete the expansion of the air bag.

11 Claims, 6 Drawing Figures

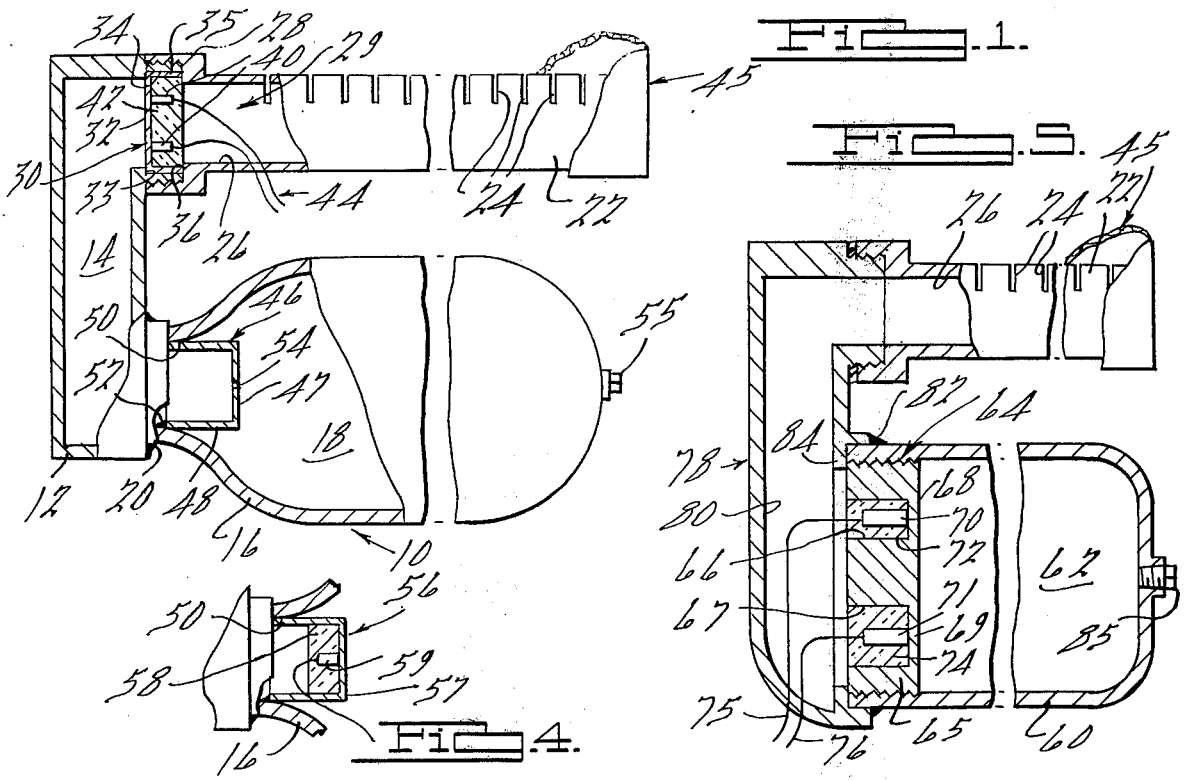
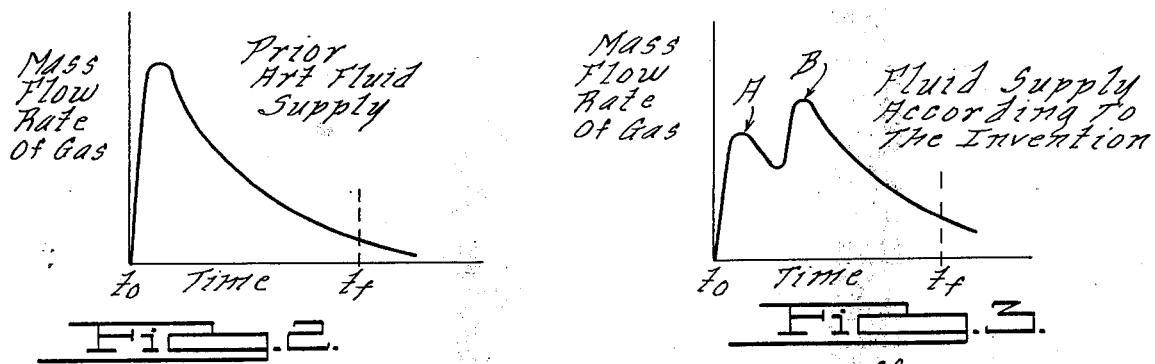
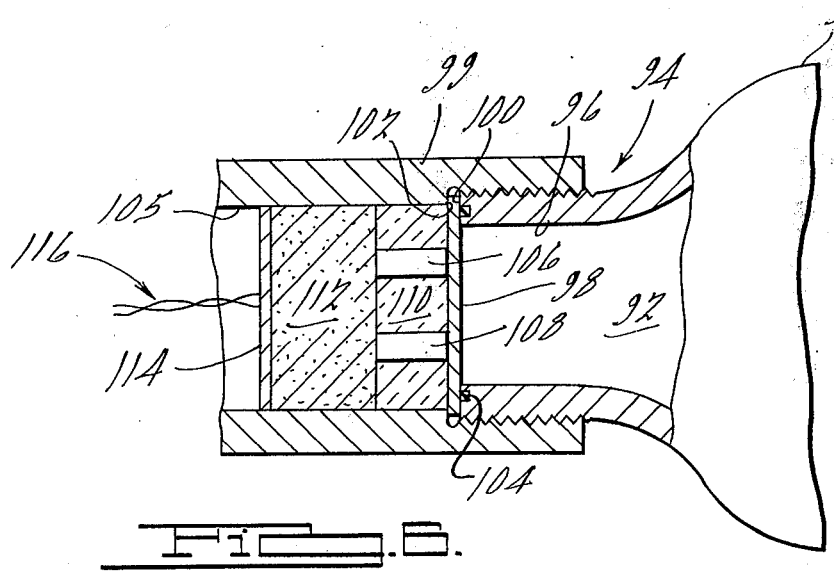

3,966,228

SEQUENCED ORIFICE FLUID SUPPLY FOR OCCUPANT RESTRAINT SYSTEM

CROSS REFERENCE TO RELATED APPLICATION

This application is a continuation of application Ser. No. 278,163, filed Aug. 4, 1972 (now abandoned).

BACKGROUND OF THE INVENTION

1. Field of the Invention

The present invention relates generally to an occupant restraint system of the type having a confinement which is expanded by a fluid supply to restrain movement of an occupant of a vehicle during a collision. Such a system is illustrated and described in U.S. Letters Patent 3,516,685 and 3,602,527.

2. Description of the Prior Art

The expandable confinement, commonly referred to as an air bag or air cushion, has a collapsed inoperative condition for storage in a steering wheel, dashboard or other location within a vehicle at a position generally forward of a normal occupant position. Upon the sensed occurrence of a collision of the vehicle, expansion of the confinement is generally effected by a fluid supply in the form of a pressure vessel having a single chamber of stored pressurized gas. The stored gas is released from the chamber by rupturing a portion of the pressure vessel which communicates with a gas directing means, such as a diffuser, communicating with the interior of the confinement. The single chamber stored gas fluid supply performs satisfactorily in most instances.

Although such an occupant restraint system appears to be simple in construction, its operational parameters are extremely sophisticated. For example, during operation of an occupant restraint system the confinement must become fully expanded within one hundred milliseconds or less from the time a collision condition of the vehicle is sensed in order to restrain the occupant of the vehicle and prevent injury. This restraint is accomplished in the prior art stored gas systems by rapidly opening the single chamber of highly compressed stored gas, such as nitrogen at a pressure of approximately 3600 psi, and directing the gas into the confinement after the sensing of a collision condition. The rapid opening of a single chamber of stored gas results in an extremely high mass flow rate of gas into the confinement during the first few milliseconds after the chamber has been opened. The flow rate of gas thereafter decreases as a function of the pressure decrease in the chamber. The rapid expansion results in a relatively high stress being placed on the confinement, a high momentum being transferred to the confinement and a relatively loud noise. The reduction of this stress, momentum and noise would be beneficial to confinement construction and cost and system performance and effect.

SUMMARY OF THE INVENTION

Accordingly, it is an object of the invention to provide a stored gas fluid supply which will expand a confinement in time to restrain an occupant of a vehicle and have a smaller maximum mass flow rate of gas than comparable prior art stored gas fluid supplies.

Another object of the invention is to provide an occupant restraint system having a confinement which expands initially, after sensing a collision, in a controlled manner and at a rate to locate an out-of-position occupant in a seat in the vehicle and thereafter at a rate to complete expansion of the confinement to restrain the occupant during the collision.

Yet another object of the invention is to provide a fluid supply which will reduce the stress placed on and the momentum of a confinement in an occupant restraint system and the magnitude of the noise produced by the fluid supply.

According to one feature of the invention, the fluid supply for the occupant restraint system includes first means that is operative to direct a first volume fluid from a source to the confinement to initially expand the confinement and second means that is operative to direct a second volume of fluid from the source into the confinement to further expand the confinement.

According to another feature of the invention, the source of fluid exists in the form of first and second pressure chambers filled with pressurized gas, and the first means directs gas from the first chamber and the second means directs gas from the second chamber.

According to still another feature of the invention, the second means is a rupture disk located between the two chambers and constructed to rupture when the pressure differential between the two chambers exceeds a predetermined value to permit the gas flow from the second chamber into the first chamber and thereafter into the confinement.

According to yet another feature of the invention, the mass of gas in the first chamber is less than the mass of gas in the second chamber.

According to another feature of the invention, the fluid supply includes a quantity of fluid under pressure in a chamber and fluid generating means which is operable upon ignition to produce a quantity of fluid, and means are provided to ignite the fluid generating means and to direct the stored fluid from the chamber in a timed delay relationship with the ignition of the fluid generating means, whereby initial expansion of the confinement is effected by the fluid generating means and the confinement is further expanded by the release of the stored pressurized fluid.

According to a further feature of the invention, the fluid supply includes a vessel defining a chamber containing a quantity of fluid under pressure and first and second sealed passages communicating with the chamber, and means are provided to rupture the passage seals to open the first passage to effect an initial expansion of the confinement by a flow of fluid from the chamber through the first passage and to thereafter open the second passage to effect the further expansion of the confinement by a flow of fluid from the chamber through the first and second passages.

BRIEF DESCRIPTION OF THE DRAWINGS

The above objects and features as well as others will become apparent from the preferred embodiments of the invention which are illustrated in the accompanying drawings wherein:

FIG. 1 is a fragmentary sectional view of an occupant restraint system embodying a fluid supply according to the invention;

FIG. 2 is a graph of mass flow rate of gas plotted against time for a typical prior art single chamber stored gas fluid supply;

FIG. 3 is a graph of the relationship of mass flow rate of gas plotted against time for a fluid supply according to the invention;

FIG. 4 is a fragmentary sectional view of a modified portion of FIG. 1;

FIG. 5 is a fragmentary sectional view of an occupant restraint system embodying a portion of another fluid supply according to the invention; and FIG. 6 is a fragmentary sectional view of yet another fluid supply according to the invention.

DESCRIPTION OF THE PREFERRED EMBODIMENTS

Construction of the FIG. 1 Embodiment

FIG. 1 illustrates an occupant restraint system including a fluid supply 10 comprising a primary pressure vessel portion 12 defining a primary pressure chamber 14, and a secondary pressure vessel portion 16 defining a secondary pressure chamber 18. The volume of primary chamber 14 is less than the volume of secondary chamber 18. Pressure vessel portions 12 and 16 are rigidly secured relative to each other by a weld 20. An elongated cylindrical diffuser 22 of a known design has a plurality of generally circumferentially located slots 24 spaced along the axis of the diffuser and communicating with an internal gas directing passage 26. An end 28 of diffuser 22 is in threaded engagement with an end portion of primary pressure vessel 12.

Adjacent the threaded engagement of diffuser 22 and primary pressure vessel portion 12 is a normally closed valve assembly 29 having a cup-shaped rupture disk 30 having a circular end portion 32 engaged with a shoulder 33 on primary pressure vessel 12 portion and sealing a circular opening 34 in the primary pressure vessel. Opening 34 is adapted to communicate with passage 26 of diffuser 22 and chamber 14 with the removal of valve assembly 29. Cup-shaped rupture disk 30 further includes an annular side portion 35 which engages a shoulder 36 on diffuser 22 adjacent the threaded engagement. Shoulders 33 and 36 coact to retain disk 30 in its proper location within opening 34. Two explosive charges 40, similar to those illustrated and described in U.S. Letters Pat. No. 3,567,245, are embedded within a plug 42, made of an incompressible material, positioned within cup-shaped rupture disk 30. Electrical leads 44 are connected to each of the explosives 40 and to a collision detecting sensor such as described and illustrated in U.S. Letters Pat. No. 3,414,292.

A collapsed confinement 45, of a known design, having an inoperative condition for storage and an expanded condition for restraining an occupant of a vehicle in which the confinement is located, is fragmentally illustrated in FIG. 1 encircling a portion of diffuser 22. The confinement is commonly referred to as an air bag or air cushion; confinements of this type are described and illustrated in U.S. Letters Pat. Nos. 3,516,685 and 3,602,527.

A second cup-shaped rupture disk 46 has a circular disk portion 47 and an annular side portion 48 rigidly secured within an opening 50 of secondary pressure vessel portion 16 by a weld 52. A small opening 54 is located centrally in disk portion 47 of rupture disk 46. Opening 54 is much smaller than openings 34 and 50.

Either prior to or after the location of the system into a vehicle, gas under pressure is introduced into secondary pressure vessel portion 16 through a fill plug 55 of a known design. The gas is introduced at a rate which will result in a gas flow through opening 54 into primary pressure chamber 14 without rupturing disk 46. The gas is generally stored nitrogen at a pressure of from 3200 to 3600 psi. Opening 54 is primarily intended to equalize the pressure between the two pressure chambers 14 and 18.

OPERATION OF THE FIG. 1 EMBODIMENT

In order to adequately understand the operation of the invention it is believed that an understanding of a single chamber stored gas prior art fluid supply is first needed. A single chamber fluid supply comprises a pressure vessel having a single chamber of gas at a pressure of, for example, 3600 psi. and a single rupturable opening communicating with a diffuser. In operation, the opening is ruptured and the gas effects expansion of the confinement. FIG. 2 is a graph illustrating the mass flow rate of stored gas from a single chamber fluid supply plotted against time measured from the opening of the fluid supply. After opening the single chamber fluid supply, the mass flow rate of gas through the ruptured opening in the pressure vessel increases rapidly for several milliseconds and then gradually decays until the chamber is completely evacuated. The magnitude of the peak, i.e., the maximum mass flow rate, is related to the forces exerted upon the expanding confinement and, correspondingly, the forces exerted on an out-of-position occupant as well as the noise created by the system. It is therefore desirable to reduce the maximum mass flow rate of gas without affecting the time, indicated in FIG. 2 as time $t_f$, required for the complete expansion of the confinement. The mass of gas needed to effect expansion of the confinement may be determined by calculating the area under the curve shown in FIG. 2. Therefore, decreasing the maximum mass flow rate from a single chamber fluid supply, by decreasing the size of the exit opening, would result in an extension of time $t_f$. Any significant extension of time $t_f$, however, would result in improper operation of the restraint system and possible injury to the occupant of the vehicle.

In the invention system of FIG. 1, upon a collision of the vehicle, an electrical signal is fed through leads 42 from the sensor (not shown) to explosives 40. The explosives discharge, rupturing shear disk 32 and disintegrating ceramic plug 42 thereby unblocking opening 34. The stored gas in primary pressure chamber 14 expands through opening 34 into passage 26 of diffuser 22 through slots 24 and effects expansion of confinement 45. Since opening 34 is much larger than opening 54 a pressure differential is rapidly created on opposite sides of rupture disk 46. By properly selecting the relative sizes of openings 34 and 54, and the material and thickness of rupture disk 46, a time delay of a desired magnitude is created between the signal 42 reaching explosives 40 and the time at which rupture disk 46 collapses under the difference in pressure of the stored gases in the primary and secondary pressure chambers 14 and 18.

The operation of the two chamber system illustrated in FIG. 1 is graphically illustrated in FIG. 3 where the mass flow rate of a gas from the primary and secondary pressure chambers 14 and 18 is plotted against time. The first peak "A" illustrated in FIG. 3 represents the maximum mass flow rate of gas through opening 34. The mass flow rate of gas from pressure chamber 14 after peaking begins to decay until a significant pressure differential is created across rupture disk 46 to collapse and remove rupture disk 46. Upon the removal of rupture disk 46, the gas in secondary pressure chamber 18 begins to expand and flow through primary pressure chamber 14, and opening 34, to cause a second peak "B" in the mass flow rate of gas and thereafter an eventual decay until the two chambers are completely evacuated.

It is preferable to have the first peak "A" of the curve illustrated in FIG. 3 less than the second peak "B." This will result in an initial transfer of momentum from the gas in chamber 14 to confinement 45 to controllably force an out-of-position occupant into the seat and initiate expansion of the confinement. A more rapid and complete expansion of the confinement by the gas in chamber 18 thereafter occurs to restrain the occupant during the collision. Further, since operation of the fluid supply in FIG. 1 generates two peaks, rather than one peak as in FIG. 2, the mass flow rate of gas out of fluid supply 10 is more constant over the time period $t_o$ to $t_f$ (precollision to full expansion of the confinement) resulting in a more constant expansion of confinement 45 and less stress on the confinement.

The magnitude of each of the peaks in FIG. 3 may be raised or lowered and the time between the two peaks may be lengthened and shortened by varying the volume of pressure chambers 14 and 18, the cross-sectional areas of openings 34, 50 or 54, or the material and size of rupture disk 46; and all of these factors may be selectively varied while still maintaining complete expansion of the confinement by time $t_f$.

FIG. 4 MODIFICATION OF THE FIG. 1 EMBODIMENT

FIG. 4 illustrates a modification of the portion of the fluid supply of FIG. 1 defining opening 50 in pressure vessel 16. Specifically, rupture disk 46 is replaced by a cup-shaped valve assembly 56 including a cup-shaped rupture disk 57, a ceramic plug 58 positioned within disk 57, and an explosive 59. For the purpose of filling chambers 14 and 18, a second fill plug, similar to plug 55, may be attached to pressure vessel 12 or a small passage or opening can be used to communicate chamber 14 with chamber 18 to equalize the pressure of the gas between the two chambers.

OPERATION OF THE MODIFIED FIG. 1 EMBODIMENT

The collision detecting sensor transmits an electrical signal to explosive 40 and to a timed delay circuit of known design (not shown) which is connected to explosive 59. Explosives 40 rupture disk 30 permitting the gas in primary chamber 14 to flow into confinement 45. This gas flow creates the first peak "A" in FIG. 3. After a period of milliseconds the timed delay circuit transmits an electrical signal to explosive 59, rupturing disk 57 and permitting the gas in secondary chamber 18 to flow into confinement 45. This second gas flow creates the second peak "B" in FIG. 3. The time of the delay is chosen so that actuation of explosive 59 occurs after the mass flow rate of gas from chamber 14 begins to decrease.

CONSTRUCTION OF THE FIG. 5 EMBODIMENT

FIG. 5 fragmentally illustrates a pressure vessel 60 defining a pressure chamber 62. A dual explosive cap 64 is in threaded engagement with one end of pressure vessel 60 and includes a metal plug 65 having blind bores 66 and 67 defining reduced thickness rupture disk portions 68 and 69. Bore 66 is smaller than bore 67. Explosives 70 and 71 are located in bores 66 and 67 adjacent rupture disk portions 68 and 69. Explosives 70 and 71 are respectively embedded in ceramic plugs 72 and 74. Electrical leads 75 and 76 are connected to each of the explosives 70 and 71 and to an electrical circuit that is connected to a collision detecting sensor.

A gas directing housing 78 having a passage 80 in fluid communication with bores 66 and 67 is welded at 82 to one end of pressure vessel 60 proximate explosive valve 64. An annular shoulder 84 on gas directing housing 78 contacts the metal plug 65 of explosives valve 64 and prevents the plug from disassociating itself from pressure vessel 60. Passage 80 is in fluid communication with passage 26 of diffuser 22. The remainder of the assembly is generally similar to that illustrated and described in reference to FIG. 1 with the exception that passage 80 in FIG. 5 communicates directly with passage 26 of diffuser 22.

OPERATION OF THE FIG. 5 EMBODIMENT

Stored gas under a pressure of from 3200 to 3600 psi is introduced into pressure chamber 62 through a fill plug 85 of a known design. Upon the sensing of a collision condition an electrical signal is sent to explosive 70 through lead 75. Explosive 70 discharges, removing ceramic plug 72 and rupturing disk portion 68. The stored gas exits rapidly from pressure chamber 62 through bore 66 into passage 80 and eventually into confinement 45. A short time later a second electrical signal is transmitted to explosive 71 through lead 76 removing ceramic plug 74 and rupturing disk portion 69. The remaining amount of stored gas in pressure vessel 62 exits thereafter through bores 66 and 67 into passage 80 and eventually into confinement 45. The delay between the firing of explosives 70 and 71 may be effected by any one of a number of well known timed delay electrical circuits which are actuated by an electrical signal from the collision detecting sensor.

The arrangement in FIG. 5 will operate in a manner much like the arrangement in FIG. 1. A first peak "A" will be caused by the actuation of explosive 70 and the removal of disk portion 66 and a second peak "B" will be caused by the actuation of explosive 71 and the removal of disk portion 69. The time between the peaks "A" and "B" is governed by the time between the actuation of the explosives. In an actual operation the time delay may be 8 to 12 milliseconds. Complete expansion of confinement 45 must be effected within a time period that is less than 100 milliseconds from the time a collision condition is first sensed in order to protect an occupant of the vehicle. Selective variation of the sizes of bores 66 and 67 will result in selective variation of the relative magnitude of peaks "A" and "B."

CONSTRUCTION OF THE FIG. 6 EMBODIMENT

The fluid supply of FIG. 6 includes a pressure vessel 90 fragmentally illustrated defining a pressure chamber 92. One end of pressure vessel 90 has a reduced portion 94 having an opening 96 sealed by a shear disk 93. The reduced portion 94 is in threaded engagement with a gas directing housing 99 which is similar in operation to the gas directing housing 78 of FIG. 5. Shear disk 98 is located between the outer end portion 100 of reduced portion 94 of pressure vessel 90 and a shoulder 102 of housing 99 adjacent the threaded engagement. An O-ring 104 is located in an annular groove in outer portion 100 of reduced portion 94 and contacts shear disk 98 to aid in the sealing of opening 96. Similar seals may be used in the other embodiments where appropriate. A passage 105 in gas directing housing houses explosive charges 106 and 108 which are embedded in a ceramic plug 110. A cylindrical plug of pyrotechnic gas generating material 112, such as Amoco JT 1/20 produced by Amoco Chemical Company, is located in passage 105 and engages explosive charges 106 and 108 at one end. An igniter 114, in the form of an explosive, seals the other end of pyrotechnic plug 112. Electrical leads 116 connected to a collision detecting sensor are engaged with igniter 114. Passage 105 is in fluid communication with passage 26 of a diffuser 32 in a manner similar to the arrangement illustrated in FIG. 5. Gas at a pressure of from 3200 to 3600 psi occupies pressure chamber 92.

An annular disk 118 having a centrally located opening 120 is attached to housing 99 adjacent igniter 114. Opening 120 acts as an orifice to increase the pressure of the gas produced by pyrotechnic plug 112 prior to the gas entering passage 105. An increase in the gas pressure results in an increase in the burning rate of pyrotechnic plug 112 and accordingly a more rapid expansion of the confinement.

OPERATION OF THE FIG. 6 EMBODIMENT

Upon sensing a collision condition, the sensor transmits an electrical signal through leads 116 to explosive 114 causing the ignition of the gas generating pyrotechnic plug 112. The ignition of gas generating material 112 creates a gas which flows through opening 120, passage 105 and diffuser 22 into confinement 45 causing a rapid initial expansion of the confinement resulting in the first peak "A" illustrated in FIG. 3. As the pyrotechnic burns, the flame reaches explosive charges 106 and 108 causing an explosion which removes ceramic plug 110 and annular disk 118 and ruptures shear disk 98. This results in the release of the stored gas in pressure chamber 92 causing the second peak "B" in the mass flow rate of gas from the fluid supply. The portion of the curve that includes peak "A" in FIG. 3, and the time between the peaks "A" and "B", may be governed by adjusting the burning rate or size of the pyrotechnic plug 112. Such adjustments are well known in the explosive and rocketry arts.

SUMMARY OF THE EMBODIMENTS

As described above, all four of the embodiments illustrated produce the double peak mass flow rate curve illustrated in FIG. 3., Through various changes in each of the designs, the distance between the peaks, and the magnitude of each of the peaks, may be adjusted. The volume of the stored gas in the pressure chamber(s), as well as the pressure within the chamber(s), will vary with each of the systems. The mass of the stored gas in each fluid supply is related to the mass of the gas needed to expand the confinement.

One or more pressure chambers may be added to the illustrated fluid supplies to cause additional peaks in the mass flow rate. For example, in the embodimentt of FIG. 1, another pressure chamber and rupture disk may be located in series with pressure chamber 18. The three chamber fluid supply would result in three peaks in FIG. 3. The pyrotechnic-explosive arrangement of FIG. 6 may also be used to replace the explosive valve opening arrangement 40 of FIG. 1. In this latter arrangement, an initial expansion would be caused by the burning of the pyrotechnic, a further expansion by the stored gas in chamber 14 after the rupture of disk 32, and the complete expansion by the stored gas in chamber 18 after the rupture of disk 46. Other variations of the disclosed invention will be obvious to those skilled in the art, keeping in mind that it is desirable to create an initial puffing or expansion of the confinement, at as constant a flow rate as possible in order to reduce the maximum flow rate and effect expansion within the desired time frame.

What is claimed is:

1. A fluid supply for an occupant restraint system having:
   a confinement having a collapsed inoperative condition and an expanded operative condition for restraining movement of an occupant of a vehicle during a collision, said fluid supply comprising:
   means for directing fluid into the confinement;
   a vessel defining first and second pressure chambers fluidically in series;
   gas under pressure in the first and second pressure chambers; means substantially blocking fluid flow between said first and second chambers;
   means for directing an initial flow of the gas from the first chamber into the fluid directing means to effect an initial expansion of the confinement; and
   means for subsequently removing said blocking means and directing a flow of the gas from the second chamber through the first chamber and into the fluid directing means to effect full expansion of the confinement after the confinement has been initially expanded.

2. An occupant restraint system according to claim 1 herein:
   the mass of gas in the first chamber is less than the mass of gas in the second chamber;
   the mass of gas in the first and second chambers is greater than the mass of gas needed to expand the confinement; and
   the mass of gas needed to expand the confinement is greater than the mass of gas in the first chamber.

3. A fluid supply according to claim 1 wherein:
   the vessel further defines a first opening communicating the first chamber with the fluid directing means and a second opening communicating the first chamber with the second chamber;
   the means for directing the flow of the fluid from the first chamber comprises
   a. a first means sealing the first opening, and
   b. means operable in response to a collision signal to unseal the first sealing means; and
   said blocking means comprises rupturable orifice means and said removing means comprises the pressure difference between said first and second chambers created by said initial flow, whereby said rupturable orifice means in ruptured to change from a size initially substantially restricting fluid flow to a size permitting substantially greater flow.

4. A fluid supply for use with an occupant restraint system including a confinement having a collapsed inoperative condition and an expanded operative condition for restraining movement of an occupant of a vehicle during a collision and means for directing fluid into the confinement, the fluid supply comprising:
   a source of fluid including first and second pressure chambers occupied by fluid and arranged fluidically in series;
   first means operative to direct an initial flow of fluid from the first chamber to the fluid directing means to effect an initial expansion of the confinement; and second means operative to subsequently direct fluid from said second chamber to said first chamber permitting a secondary fluid flow at a rate greater than said initial flow to the fluid directing means such that said initial and secondary fluid flows are combined to effect further expansion of the confinement after the confinement has been initially expanded.

5. A fluid supply according to claim 4 wherein said first means comprises a first opening communicating said first chamber with said fluid directing means, a first rupture disk sealing said first opening, and means to rupture said first rupture disk; and said second means comprises a second opening communicating said second chamber with said first chamber, a second rupture disk normally blocking said second opening, said second rupture disk rupturing subsequently to said first rupture disk, and a passage in said second rupture disk having a cross sectional area that is substantially less than the cross sectional area of said first opening, whereby pressure in said first and second chambers is equivalized prior to rupture of said first rupture disk.

6. A fluid supply for a vehicle occupant restraint system of the type having an inflatable confinement and means responsive to a collision to inflate said confinement, said fluid supply comprising:
   a. a source of pressurized fluid including reservoir means containing a predetermined amount of fluid under pressure;
   b. means operable to direct fluid flow from said source;
   c. means operable to activate said fluid source and release fluid from said reservoir means;
   d. two-stage means including a first chamber within said reservoir means connected to discharge fluid to said directing means and a second chamber within said reservoir means and arranged fluidically in series with said first chamber, said two-stage means being responsive to said activation means and operable to permit a first stage flow of fluid from said first chamber, having a predetermined maximum mass flow rate to said directing means and operable to subsequently permit a second stage flow from said second chamber, through said first chamber, having a second predetermined maximum mass flow rate occurring subsequent to said first stage maximum mass flow rate, said second stage maximum being greater than said first stage maximum.

7. The fluid supply defined in claim 6 wherein said two-stage means includes rupturable means disposed in the flow path intermediate said first and second fluid chambers, said rupturable means being operable to initially substantially restrict release of fluid from said second chamber and, upon loss of fluid in said first chamber, said rupturable means being ruptured to permit a substantially greater flow of fluid from said second chamber.

8. The fluid supply defined in claim 7, wherein said activating means includes electroexplosive means.

9. The fluid supply defined in claim 7, wherein said rupturable means includes a disk responsive upon loss of fluid in said first chamber to the pressure differential between said first and second chambers.

10. The fluid supply defined in claim 6, wherein said reservoir means includes an exit passage communicating said first chamber with said fluid directing means and a second passage communicating said second chamber with said first chamber and said two-stage means includes rupturable means disposed in said second passage, said rupturable means being operable to release fluid from said second chamber upon loss of fluid in said first chamber.

11. The fluid supply defined in claim 10, wherein said rupturable means includes a bleed orifice such that the fluid pressure in said first and second chambers is equalized prior to release of fluid from said first chamber.

* * * * *